United States Patent

Ishizuka et al.

[11] 4,101,488
[45] Jul. 18, 1978

[54] WATER-SOLUBLE HEAT-RESISTANT INSULATING VARNISH

[75] Inventors: Takashi Ishizuka; Naoki Miwa, both of Ibaraki, Japan

[73] Assignee: Nitto Electric Industrial Co., Ltd., Ibaraki, Japan

[21] Appl. No.: 617,135

[22] Filed: Sep. 26, 1975

[30] Foreign Application Priority Data

Sep. 26, 1974 [JP] Japan .................... 49-111229

[51] Int. Cl.² .................... C08J 3/08; C08L 79/08
[52] U.S. Cl. .................... 260/29.2 N; 260/29.2 E; 528/289; 528/170
[58] Field of Search .................... 260/29.2 N, 29.2 E, 260/78 TF, 75 N

[56] References Cited

U.S. PATENT DOCUMENTS 3,697,471  10/1972  Schmidt et al. .................. 260/78 TF
3,925,313  12/1975  Kojima et al. .................. 260/29.2 N

FOREIGN PATENT DOCUMENTS 1,036,426  8/1958  Fed. Rep. of Germany ... 260/29.2 N

*Primary Examiner*—Allan Lieberman
*Attorney, Agent, or Firm*—Sughrue, Rothwell, Mion, Zinn and Macpeak

[57] ABSTRACT

A water-soluble heat-resistant insulating varnish containing a resin comprising ester groups and imide rings in the molecule dissolved in water using a volatilizable basic compound, the resin comprising the reaction product of (A) a carboxyl-containing polyesterimide resin having an acid value of about 30 to 150 obtained by reacting (a) a polyhydric alcohol component comprising at least one organic polyhydric alcohol and containing about 10 to 60 mol % of an imide ring-containing glycol of the general formula (I):

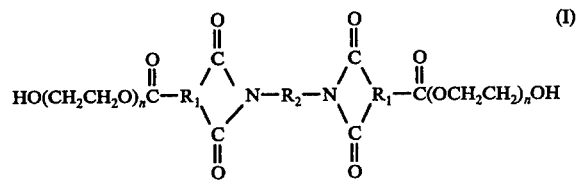

wherein $R_1$ is a trivalent aromatic group, $R_2$ is a divalent organic group, and $n$ is an integer of 1 to 3, with (b) a polycarboxylic acid component comprising at least one trivalent or divalent organic carboxylic acid or the anhydride thereof, where about 30 to 100 mol % of which comprises an aromatic tricarboxylic acid or the anhydride thereof so that the equivalent ratio (OH/COOH) between the polyhydric alcohol component and the polycarboxylic acid component is about 1.0 to 2.0;

(B) 1,2,3,4-butanetetracarboxylic acid or an imide-forming derivative thereof; and (C) an organic diamine.

25 Claims, No Drawings

WATER-SOLUBLE HEAT-RESISTANT INSULATING VARNISH

BACKGROUND OF THE INVENTION

1. Field of the Invention

This invention relates to water-soluble heat-resistant insulating varnishes.

2. Description of the Prior Art

Most of the conventional insulating varnishes, above all, wire enamels, are of the solvent-based type dissolved in an organic solvent such as cresol, xylene or naptha. These varnishes, however, have involved high production costs because the solvent volatilizes during the production of insulated electric wires and cables and it is also necessary to incinerate the solvent completely using a burning furnace. The use of these organic solvents also is likely to cause air pollution, and because of the offensive odor of the organic solvent, the working environment is not entirely satisfactory. In addition, there is always a danger of fire because of the flammability of the solvent. It has therefore been desired to develop insulating varnishes which have reduced likelihood of causing these hazards.

In recent years, there has been a rapidly increasing demand for polyesterimide resin varnishes as cable and wire enamels because of their superior heat resistance. However, films obtained from these resin varnishes have the serious defect that when stretched 3 to 5%, they develop a marked crazing phenomenon in a solvent or water, and therefore, it has been strongly desired to solve the problem of crazing for practical purposes.

SUMMARY OF THE INVENTION

An object of this invention is to provide a water-soluble heat-resistant insulating varnish free from the defects of conventional insulating varnishes.

Extensive investigations have led to the discovery that the above object of this invention is achieved with a varnish comprising a resin containing ester groups and imide rings in the molecule dissolved in water using a basic compound, the resin comprising the reaction product of (A) a carboxyl-containing polyesterimide resin having an acid value of about 30 to 150 obtained by reacting (a) a polyhydric alcohol component comprising at least one organic polyhydric alcohol and containing about 10 to 60 mol % of an imide ring-containing glycol of the general formula (I):

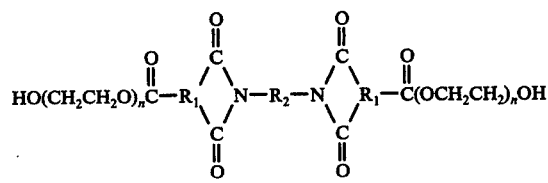

wherein $R_1$ is a trivalent aromatic group, $R_2$ is a divalent organic group, and $n$ is an integer of 1 to 3, and (b) a polycarboxylic acid component comprising at least one trivalent or divalent organic carboxylic acid or the anhydride thereof, about 30 to 100 mol % of which comprises an aromatic tricarboxylic acid or the anhydride thereof so that the equivalent ratio (OH/COOH) between the polyhydric alcohol component and the polycarboxylic acid component is about 1.0 to 2.0;

(B) 1,2,3,4-butanetetracarboxylic acid or an imide-forming derivative thereof; and (C) at least one organic diamine.

DETAILED DESCRIPTION OF THE INVENTION

The water-soluble heat-resistant insulating varnish obtained in accordance with this invention contains water as a medium, and does not require an expensive solvent. As further advantages, this varnish is odorless and non-toxic and is free from the danger of fire or explosion. Moreover, it is surprising that a crazing phenomenon, which is the defect of conventional ester imide resins, does not occur with this varnish. This advantage is most important in practical applications of the varnish, and constitutes a characteristic feature of this invention.

The imide ring-containing glycol used in the polyhydric alcohol component in this invention is expressed by the general formula (I):

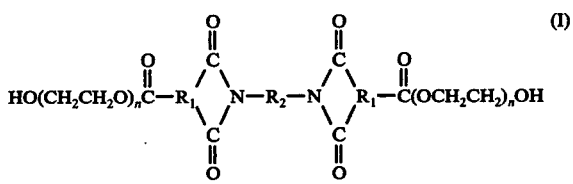

wherein $R_1$, $R_2$ and n are the same as defined above, and can be prepared by reacting an aromatic tricarboxylic anhydride of the general formula (II):

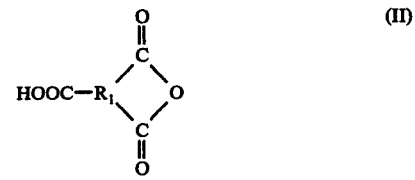

wherein $R_1$ is a trivalent aromatic group, with an organic diamine of the general formula (II):

$$H_2N-R_2-NH_2 \qquad (III)$$

wherein $R_2$ is a divalent organic group, at a temperature from about 150° to about 300° C in a glycol selected from the group consisting of ethylene glycol, diethylene glycol and triethylene glycol, with the amount of the aromatic tricarboxylic anhydride being adjusted to about 2 mols per mol of the organic diamine of the general formula (III). The presence of materials remaining unreacted is not preferred. The reaction can be carried out by feeding the aromatic tricarboxylic anhydride, the organic diamine and the glycol simultaneously to the reaction vessel and gradually elevating the temperature of the resulting mixture from room temperature to about 150° C followed by allowing the mixture to react at a temperature of about 150° to about 300° C, preferably 150° to 200° C, for several hours to obtain a resinous material. Generally, the reaction does not require catalysts, an inert atmosphere or pressurized conditions. The use of a water-soluble solvent in this reaction is often effective for rendering the reaction system homogeneous. Examples of preferred solvents are organic polar solvents such as N,N-dimethylformamide, N,N-diethylformamide, N,N-dimethylacetamide, N,N-diethylacetamide or N-methyl-2-pyrrolidone. Sometimes, solvents of the cellosolve or carbitol type can also be used. The amount of the solvent is an amount sufficient to render the reaction system homogeneous. The solvent can be removed after the formation of the imide ring-containing glycol of the general formula (I), or can be left in the water-soluble heat-resistant insulating varnish finally obtained. The resulting imide ring-containing glycol of the formula (I) can be used after purification, or usually, can be used as a raw material in the subsequent reaction step without purification.

The aromatic tricarboxylic anhydride used to prepare the imide ring-containing glycol of the general formula (I) is selected from those of the above general formula (II) in which $R_1$ is selected from the group consisting of

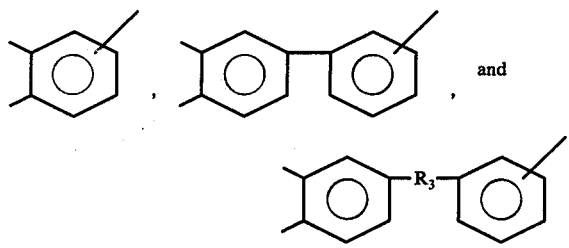

wherein $R_3$ is selected from the group consisting of —$CH_2$—, —O—, —S—, —$SO_2$—, —CO— and

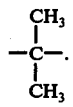

Typical examples of aromatic tricarboxylic anhydrides of the general formula (II) are trimellitic anhydride, hemimellitic anhydride, 3,4,3' (or 3,4,4')-diphenyltricarboxylic anhydride, 3,4,3' (or 3,4,4')-diphenylmethanetricarboxylic anhydride, 3,4,3' (or 3,4,4')-diphenylethertricarboxylic anhydride, 3,4,3' (or 3,4,4')-diphenylsulfidetricarboxylic anhydride, 3,4,3' (or 3,4,4')-diphenylsulfonetricarboxylic anhydride, 3,4,3' (or 3,4,4')-diphenylketonetricarboxylic anhydride, 3,4,3' (or 3,4,4')-diphenylpropanetricarboxylic anhydride, and mixtures of these anhydrides.

The organic diamines of the general formula (III) used to obtain the above imide ring-containing glycol of the general formula (I) are selected from those of the above general formula (III) in which $R_2$ is selected from the group consisting of —$CH_2$)$_{n_1}$ wherein $n_1$ is an integer of 1 to 6,

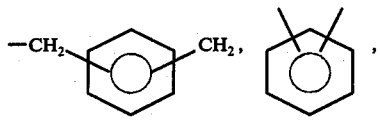

-continued

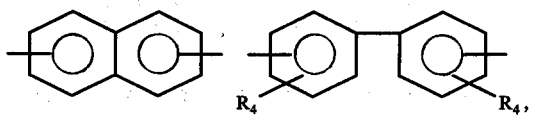

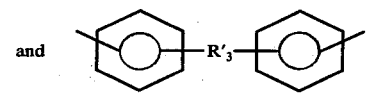

wherein $R'_3$ is selected from the group consisting of —$CH_2$—, —O—, —S—, —$SO_2$—, —CO—,

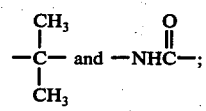

and $R_4$ is selected from the group consisting of a hydrogen atom, an alkoxy group, an alkyl group and a halogen atom.

Typical examples of organic diamines of the general formula (III) include ethylene diamine, hexamethylene diamine, meta-xylylene diamine, para-xylylene diamine, meta-phenylene diamine, para-phenylene diamine, benzidine, 3,3'-dimethoxybenzidine, 3,3'-dichlorobenzidine, 3,3'-dimethylbenzidine, 1,5-diaminonaphthalene, 2,6-diaminonaphthalene, 4,4'-diaminodiphenylmethane, 4,4' (or 3,4')-diaminodiphenyl ether, 4,4'-diaminodiphenyl sulfide, 3,3' (or 4,4')-diaminodiphenyl sulfone, 4,4'-diaminodiphenyl ketone, 4,4'-diaminodiphenyl propane, 3,4'-diaminobenzanilide, and mixtures of these organic diamines.

Examples of organic polyhydric alcohols which can be used in combination with the imide ring-containing glycol of the general formula (I) in the polyhydric alcohol component include ethylene glycol, propylene glycol, 1,4-butanediol, 1,5-pentanediol, 1,6-hexanediol, 1,7-heptanediol, 1,8-octanediol, 1,9-nonanediol, 1,10-decanediol, diethylene glycol, dipropylene glycol, triethylene glycol, 4,4'-dihydroxymethyldiphenyl, 4,4'-dihydroxyethyldiphenyl, 4,4'-dihydroxymethyldiphenylmethane, 4,4'-dihydroxyethyldiphenylmethane, 4,4'-dihydroxymethyldiphenyl ether, 4,4'-dihydroxyethyldiphenyl ether, 4,4'-dihydroxymethyldiphenyl sulfide, 4,4'-dihydroxyethyldiphenyl sulfide, 4,4'-dihydroxymethyldiphenyl sulfone, 4,4'-dihydroxyethyldiphenyl sulfone, 4,4'-dihydroxymethyldiphenyl ketone, 4,4'-dihydroxyethyldiphenyl ketone, 4,4'-dihydroxymethyldiphenylpropane, 4,4'-dihydroxyethyldiphenylpropane, bis-(2-hydroxyethyl)isophthalate, bis-(2-hydroxyethyl)isophthalate, bis-(2-hydroxyethyl)phthalate, glycerol, trimethylol propane, 1,2,6-hexanetriol, 3-methyl-1,3,5-hexanetriol, tris-(2-hydroxyethyl)isocyanurate, pentaerythritol, and mixtures of these organic polyhydric alcohols.

The imide ring-containing glycol of the general formula (I) is used in the polyhydric alcohol component generally in an amount of about 10 to 60 mol% based on the total mols of the imide ring-containing glycol of the general formula (I) and the organic polyhydric alcohol in the polyhydric alcohol component. If the amount is less than about 10 mol%, a baked film of the water-soluble heat-resistant insulating varnish finally obtained has poor thermal properties. If the amount is larger than about 60 mol%, the resulting water-soluble heat-resistant insulating varnish sometimes becomes turbid.

The aromatic tricarboxylic acid or anhydride thereof used in the polycarboxylic acid component in this invention is represented by the general formula (IV) or (V), respectively

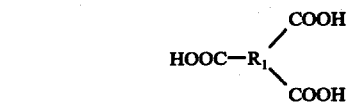 (IV)

or

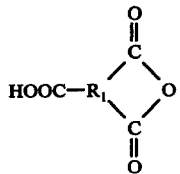 (V)

wherein $R_1$ is a trivalent aromatic group, in which $R_1$ is selected from the group consisting of

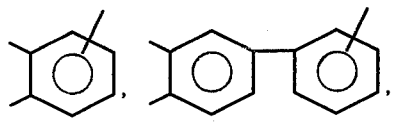

and 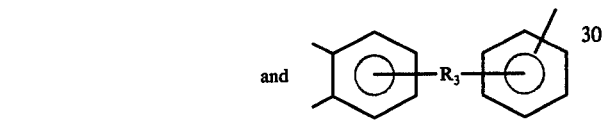

wherein $R_3$ is selected from the group consisting of —$CH_2$—, —O—, —S——$SO_2$—, —CO—, and

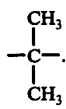

Typical examples of aromatic tricarboxylic acids or anhydride thereof of the general formulas (IV) and (V) are trimellitic acid (or the anhydride thereof), hemimellitic acid (or the anhydride thereof), trimesic acid (or the anhydride thereof), 3,4,3' (or 3,4,4')-diphenyltricarboxylic acid (or the anhydride thereof), 3,4,3' (or 3,4,4')-diphenylmethanetricarboxylic acid (or the anhydride thereof), 3,4,3' (or 3,4,4')-diphenylether tricarboxylic acid (or the anhydride thereof), 3,4,3' (or 3,4,4')-diphenylsulfidetricarboxylic acid (or the anhydride thereof), 3,4,3' (or 3,4,4')-diphenylsulfonetricarboxylic acid (or the anhydride thereof), 3,4,3' (or 3,4,4')-diphenylketonetricarboxylic acid (or the anhydride thereof), 3,4,3' (or 3,4,4')-diphenylpropanetricarboxylic acid (or the anhydride thereof), and mixtures thereof.

The trivalent or divalent organic carboxylic acid or the anhydride thereof which can be used together with the above aromatic tricarboxylic acid or the anhydride thereof of the general formulas (IV) and (V) in the polycarboxylic acid component is preferably an organic dicarboxylic acid or, the anhydride thereof expressed by the general formula (VI) or (VII), respectively,

HOOC—$R_5$—COOH (VI)

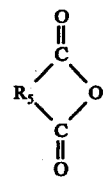 (VII)

in which $R_5$ is a divalent organic group selected from the group consisting of

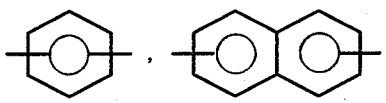

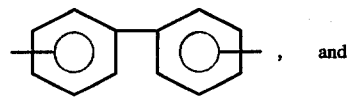

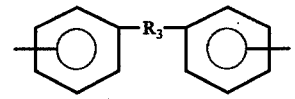, and in which $R_3$ is selected from the group consisting of —$CH_2$—, —O—, —S—, —$SO_2$—, —CO—, and

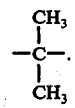

Typical examples of the above polycarboxylic acids and anhydrides thereof of the general formulas (VI) and (VII) are succinic acid, succinic anhydride, adipic acid, malonic acid, sebacic acid, phthalic acid, phthalic anhydride, isophthalic acid, terephthalic acid, naphthalene-1,4 (or 1,5 or 2,6, etc.)-dicarboxylic acid having the formula

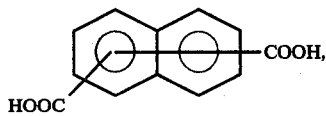

3,3' (or 4,4', etc.)-dicarboxydiphenyl having the formula

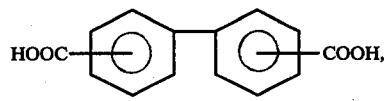

3,3' (or 4,4', etc.)-dicarboxydiphenylmethane, 3,3' (or 4,4', etc.)-dicarboxydiphenyl ether, 3,3' (or 4,4', etc.)-dicarboxydiphenyl sulfide, 3,3' (or 4,4', etc.)-dicarboxydiphenyl sulfone, 3,3' (or 4,4', etc.)-dicarboxydiphenyl ketone, 3,3' (or 4,4', etc.)-dicarboxydiphenyl propane having the formula

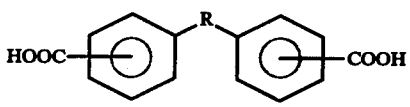

wherein R represents a methylene group, an oxygen atom, a sulfur atom, an —SO₂— group, a

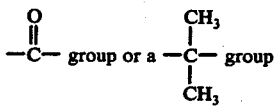

or mixtures thereof.

The 1,2,3,4-butanetetracarboxylic acid and the imide-forming derivatives thereof (B) are compounds capable of forming an imide ring by reaction with an organic diamine, such as 1,2,3,4-butanetetracarboxylic acid, 1,2,3,4-butanetetracarboxylic monoanhydride, 1,2,3,4-butanetetracarboxylic dianhydride, or dimethyl 1,2,3,4-butanetetracarboxylate.

As (C) the organic diamine to be reacted with (B) the 1,2,3,4-butanetetracarboxylic acid (or an imide-forming derivative thereof), the organic diamine of the formula (III):

$$H_2N—R_2—NH_2 \qquad (III)$$

wherein R₂ is a divalent organic group, as herein before described, which is used in the preparation of the imide ring-containing glycol of the general formula (I), can be advantageously utilized.

The water-soluble heat-resistant insulating varnish of this invention can be prepared by the following procedure.

First, the polyhydric alcohol component comprising the organic polyhydric alcohol containing about 10 to 60 mol% of the imide ring-containing glycol of the general formula (I) is reacted with the polycarboxylic acid component comprising the trivalent or divalent organic carboxylic acid of the general formula (VI) (or the anhydride thereof of the general formula (VII)), where about 30 to 100 mol% of which is the aromatic tricarboxylic acid of the general formula (IV) (or the anhydride thereof of the general formula (V)), with the polyhydric alcohol component being used in excess, to obtain the carboxyl-containing polyesterimide resin (A). In this polycondensation reaction, a suitable equivalent ratio of the polyhydric alcohol component to the polycarboxylic acid component (OH/COOH) is usually about 1.0 to 2.0, preferably 1.15 to 1.95. If the ratio is less than about 1.0, a gelation phenomenon occurs before the molecular weight of the carboxyl-containing polyesterimide resin (A) sufficiently increases in the course of the reaction. On the other hand, if the ratio is above 2.0, the resulting carboxyl-containing polyesterimide resin (A) has so low a molecular weight that a tough film is difficult to form at the time of baking the resulting water-soluble heat-resistant insulating varnish. Ratios in excess of about 2.0 can of course be used if a measure is taken to distill the resulting reaction mixture at reduced pressure to thereby remove the organic polyhydric alcohol from the reaction system and to increase the molecular weight of the carboxyl-containing polyesterimide resin (A).

The amount of the aromatic tricarboxylic acid of the general formula (IV) (or the anhydride thereof of the general formula (V)) is specified as about 30 to 100 mol% of the polycarboxylic acid component, because otherwise the resulting resin has poor solubility in water, and films of the varnish finally obtained sometimes have a poor appearance and poor thermal or electrical properties.

The reaction temperature at this stage is about 100° to 300° C, preferably 160° to 220° C. When the reaction is performed at this temperature for several hours, water distills off, and the reaction mixture gradually becomes a viscous resinous product with a decrease in acid value. The reaction is stopped when the acid value of the product is about 30 to 150, preferably 50 to 120. If the acid value is less than about 30 as a result of this reaction, the water-soluble heat-resistant insulating varnish finally obtained becomes turbid, and a poor appearance and poor thermal properties of the baked films tend to result. If the acid value is higher than about 150, the amount of the residual carboxyl groups in the baked films of the varnish is unnecessarily large, which tends to cause poor mechanical and electrical properties of the baked films.

A suitable amount of the polyimide component in the preparation of the carboxyl-containing polyesterimide resin (A) at this stage is usually about 20 to 70% by weight, preferably 30 to 60% by weight, bsed on the total amount of the polyester component and the polyimide component.

If the content of the polyimide component is less than about 20% by weight, the baked films finally obtained sometimes have poor thermal resistance. If the content is more than about 70% by weight, the thermal properties of the baked films are good, but unless the glycol is used in a great quantity in the preparation of the imide ring-containing glycol of the general formula (I), the reaction system solidifies, and reaction operation becomes difficult.

The carboxyl-containing polyesterimide resin (A) so obtained is then reacted with (B) the 1,2,3,4-butanetetracarboxylic acid (or an imide-forming derivative thereof) and (C) the organic diamine to form a water-soluble heat-resistant resin. A suitable amount of the butanetetracarboxylic acid or an imide-forming derivative thereof and (C) the organic diamine combined is about 20 to 200 parts by weight, preferably 30 to 150 parts by weight, per 100 parts by weight of the carboxyl-containing polyesterimide resin (A). If this total amount is less than about 20 parts by weight, the resulting water-soluble heat-resistant insulating varnish has poor solubility, and sometimes becomes turbid. Furthermore, baked films of this varnish have poor thermal resistance. On the other hand, if the total amount is more than about 200 parts by weight, the cost of production becomes too high for the extent of improvement in the thermal properties of the resulting baked films.

A suitable equivalent ratio of (B) the 1,2,3,4-butanetetracarboxylic acid (or the imide-forming derivative thereof) to (C) the organic diamine is about 0.5 to 2, preferably 0.8 to 1.3. If the equivalent ratio is less than about 0.5, the unreacted organic diamine (C) remains in the water-soluble heat-resistant varnish finally obtained, and tends to cause the varnish to be turbid. On the other hand, if the equivalent ratio is higher than about 2.0, gelation tends to occur during the reaction.

When the reaction at this stage is performed usually at about 100° to 300° C, preferably 130° to 200° C, water distills off. The main reaction at this time is an imidization reaction between (B) the 1,2,3,4-butanetetracarboxylic acid and (C) the organic diamine, but esterification occurs by the reaction of the carboxyl groups (or the anhydrides thereof) of (B) the butanetetracarboxylic acid (or the imide-forming derivative thereof) with the hydroxyl groups of the carboxyl-containing polyesterimide resin (A) to increase the molecular weight of the resin. In some cases, amide linkages can be formed by the reaction of the amino groups with the carboxyl groups of the carboxyl-containing polyesterimide resin (A). When the reaction is stopped while the acid value of the reaction product is within the range of about 30 to 150, a reddish-brown transparent resin is obtained.

At this stage, a volatilizable basic compound, such as aqueous ammonia, and water are added to the resulting resin to form a water-soluble heat-resistant insulating varnish.

The water-soluble heat-resistant insulating varnish so obtained contains mainly ester groups and imide groups in the molecule. Since the resin in the form of a salt with the basic compound such as ammonia dissociates at the time of baking, cross-linking proceeds within the molecule and between the molecules thereby to provide a film having superior insulating properties.

As previously stated, the reaction is stopped when the acid value of the reaction product usually becomes about 30 to 150. If the acid value is less than about 30, the resin does not become water-soluble even by addition of a basic compound such as ammonia, and the varnish sometimes becomes turbid. If the acid value is above about 150, unreacted materials remain, and when the resulting water-soluble heat-resistant insulating varnish is baked, it is difficult to obtain a film having superior mechanical and electrical properties.

The compound to be added in order to render the resin water-soluble is preferably a basic compound volatilizable at the time of baking the water-soluble heat-resistant insulating varnish. Typical examples of volatile basic compounds include ammonia, trialkylamines such as trimethylamine, triethylamine or tributylamine, N-alkyldiethanolamines such as N-methyldiethanolamine, N-ethyldiethanolamine or N-propyldiethanolamine, N,N-dialkylethanolamines such as N,N-dimethylethanolamine or N,N-diethylethanolamine, N,N-dibutylethanolamine, monoethanolamine, diethanolamine, triethanolamine, and mixtures thereof.

The amount of the volatilizable basic compound is an amount sufficient to render the resin water-soluble, that is, an amount sufficient to neutralize the carboxyl groups in the resin. It is not necessary to convert all of the residual carboxyl groups into salts, and therefore, it is sufficient if the amount of the volatilizable basic compound is only larger than that which renders the resin water-soluble. Even if ammonia or aqueous ammonia is added in excess, heating the varnish at about 100° C can result in the removal of the excess. The amount added generally is about 0.3 to 3 equivalents based on the residual carboxyl groups in the resin.

The pH of the resulting water-soluble heat-resistant insulating varnish is usually about 5 to 9, and preferably it is adjusted to 6 to 8.

The functional characteristics of varnishes according to the present invention will vary to some extent depending upon starting materials and the degree of polymerization employed, but generally the concentration of the components contained in the aqueous solution can range from about 30 to 55% by weight (measured as solid content at 200° C ± 2° C for 2 hours) with the viscosity being in the range of about 1 to about 100 poises (measured at 30° C using a Brookfield type viscosimeter).

The water-soluble heat-resistant insulating varnish so obtained provides a film of good properties even when the solvent is solely water. It is sometimes effective, however, to replace up to about 30% by weight of the water with a water-soluble high-boiling solvent since this renders film formation easy, and provides a film having a smooth surface. Examples of suitable water-soluble high-boiling solvents are ethylene glycol monomethyl ether, ethylene glycol monoethyl ether, ethylene glycol monoisopropyl ether, ethylene glycol monobutyl ether, ethylene glycol monoisobutyl ether, diethylene glycol monomethyl ether, diethylene glycol monoethyl ether, diethylene glycol monoisopropyl ether, diethylene glycol monobutyl ether, diethylene glycol monoisobutyl ether, triethylene glycol monomethyl ether, triethylene glycol monoethyl ether, triethylene glycol monoisopropyl ether, triethylene glycol monobutyl ether, triethylene glycol monoisobutyl ether, ethylene glycol monomethyl ether acetate, ethylene glycol monoethyl ether acetate, ethylene glycol, propylene glycol, diethylene glycol, dipropylene glycol, triethylene glycol, glycerol, N,N-dimethylformamide, N,N-diethylformamide, N,N-dimethylacetamide, N,N-diethylacetamide, N-methyl-2-pyrrolidone, N,N-dimethylmethoxyacetamide, N-methylcaprolactam, and mixtures of these solvents.

Conventional solvent-based varnishes do not provide films having sufficient properites unless an organic metal compound such as tetrabutyl titanate is added as a cross-linking agent at the time of baking. In contrast, according to this invention, baked films of sufficient properties can be obtained without using such a curing agent. In some cases, however, the addition of a water-soluble compound such as a water-soluble organic metal compound, a water-soluble phenolic resin, a water-soluble amino resin or a water-soluble epoxy resin as a curing agent can expedite film formation. Of the water-soluble organic metal compounds, titanium ammonium lactate of the formula

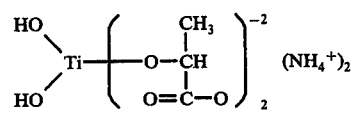

titanium lactate of the formula

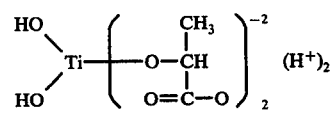

and zirconium ammonium lactate of the formula

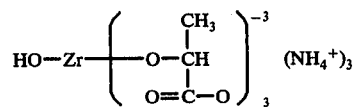

-continued

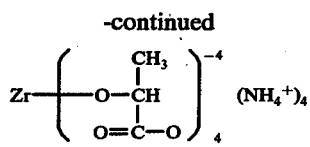

are especially effective. The use of such a water-soluble compound in an amount of up to about 10 parts by weight per 100 parts by weight of the resin (the nonvolatile component in the water-soluble heat-resistant insulating varnish) is sufficiently effective. A preferred amount is 0.1 to 5.0 parts by weight per 100 parts by weight of the resin.

The varnishes according to the present invention can be baked at a temperature above about 200° C, preferably 300° to 500° C.

The water-soluble heat-resistant insulating varnish of this invention is useful for electric insulation, especially as wire enamels. It is also useful in such applications as flexible printed circuit substrates, panel heaters or tape cables, or coated and baked on a conductor foil. The insulating varnish of this invention can also be applied as a primer or an overcoat of other paints.

The insulating varnish obtained by this invention provides useful films by application to conductors using an electric method, for example, electrophoresis, followed by baking. In some cases, the insulating varnish of this invention can also be used for coating transportation facilities such as vehicles, ships or airplanes, building materials such as aluminum sashes, and household appliances such as refrigerators or washing machines.

Alternatively, the resulting water-soluble heat-resistant insulating varnish can be powdered by evaporation of water, and can provide useful coated products using coating methods such as an electrostatic coating method or a fluidized bed coating method.

Incidentally, in the preparation of the carboxyl-containing polyesterimide resin in accordance with this invention, a part of the armoatic tricarboxylic acid of the polycarboxylic acid component reacted with the polyhydric alcohol component comprising the organic polyhydric alcohol containing the imide ring-containing glycol of the general formula (I) can be replaced by an aromatic tetracarboxylic acid (or anhydride thereof) in an amount of up to about 30 mol % based on the amount of the tricarboxylic acid or the anhydride thereof used.

The tetracarboxylic acid or the anhydride thereof is a compound expressed by the general formulas (VIII) or (IX), respectively

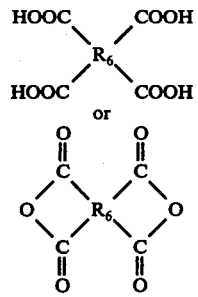

wherein $R_6$ is a tetravalent aromatic group selected from the group consisting of

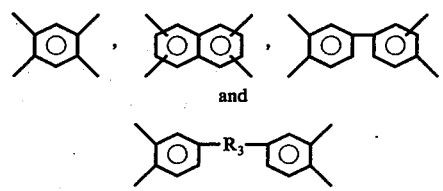

and

wherein $R_3$ is selected from the group consisting of —CH$_2$—, —O—, —S—, —SO$_2$—, —CO— and $$-\underset{\underset{CH_3}{|}}{\overset{\overset{CH_3}{|}}{C}}-.$$

Typical examples of the aromatic tetracarboxylic acid of the general formula (VIII) or the anhydride thereof of the general formula (IX) are pyromellitic acid, pyromellitic dianhydride, 1,2,5,6 (or 1,4,5,8 or 2,3,6,7):naphthalenetetracarboxylic acid (or the dianhydride thereof), 3,3',4,4'-diphenyltetracarboxylic acid (or the dianhydride thereof), 3,3',4,4'-diphenylmethanetetracarboxylic acid (or the dianhydride thereof), 3,3',4,4'-diphenylethertetracarboxylic acid (or the dianhydride thereof), 3,3',4,4'-diphenylsulfidetetracarboxylic acid (or the dianhydride thereof), 3,3',4,4'-diphenylsulfonetetracarboxylic acid (or the dianhydride thereof), 3,3',4,4'-diphenylketonetetracarboxylic acid (or the dianhydride thereof), 3,3',4,4'-diphenylpropanetetracarboxylic acid (or the dianhydride thereof), and mixtures thereof.

The following Examples are given to illustrate the invention more specifically. Unless otherwise indicated, all percents, parts, ratios and the like are by weight.

EXAMPLE 1

A 1-liter four-necked flask equipped with a Dean-Stark trap, a thermometer, a dropping funnel and a stirrer was charged with 38.4 g (0.2 mol) of trimellitic anhydride, 19.8 g (0.1 mol) of 4,4-diaminodiphenylmethane and 124 g (2.0 mols) of ethylene glycol, and the mixture was heated with stirring. At a temperature about 100° C, the mixture became transparent, but at about 140° C, became heterogeneous. On further heating with stirring, water began to distill off at a temperature of about 180° C. When the mixture was reacted at 180° to 195° C for 3 hours, it became transparent. When the reaction was performed for 2 hours at this temperature, the acid value of the product became zero. An infrared absorption spectroscopic analysis of the resulting compound showed that there was an absorption corresponding to the imide ring at 1710 cm$^{-1}$ and 1770 cm$^{-1}$. As a result of elemental analysis, the product was found to be a compound mainly containing an imide ring-containing glycol of the following formula (A):

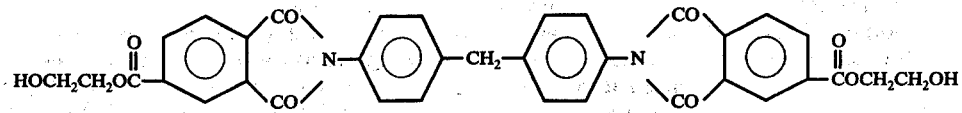

Then, the temperature of the reaction system was increased to more than 200° C, and 63 g of the ethylene glycol was distilled off. The temperature was then reduced to 150° C, and 67.2 g (0.35 mol) of trimellitic anhydride and 16.6 g (0.1 mol) of isophthalic acid were added (the OH/COOH ratio was 1.41). When the reaction was performed at 180° to 190° C for 1 hour, water distilled off, and a viscous resinous product having an acid value of 119 was obtained. Then, the temperature was reduced to 130° C, and 58.5 g (0.25 mol) of 1,2,3,4-butanetetracarboxylic acid and 49.5 g (0.25 mol) of 4,4'-diaminodiphenylmethane were added. The reaction was performed at 130° to 150° C for 1 hour. As a result, water distilled off, and a reddish-brown transparent resinous product having an acid value of 132 was obtained. Then, the temperature was reduced to 110° C, and 50 g of aqueous ammonia (concentration more than 28%; industrial grade) diluted with 100 g of water was added through the dropping funnel, and the mixture was stirred at 100° C for 30 minutes. The excess ammonia volatilized, and a reddish-brown transparent water-soluble heat-resistant insulating varnish was obtained. The varnish was further diluted with water to adjust the viscosity of the varnish to 15 poises (measured at 30° C using a Brookfield-type viscometer). The non-volatile content of this varnish (after drying for 2 hours at 200° ± 2° C) was 42.5%. This varnish had a pH of 6.5.

EXAMPLE 2

A 1-liter four-necked flask equipped with a Dean-Stark trap, a thermometer, a dropping funnel and a stirrer was charged with 76.8 g (0.4 mol) of trimellitic anhydride, 40.0 g (0.2 mol) of 4,4'-diaminodiphenyl ether and 124 g (2.0 mols) of ethylene glycol, and the mixture was heated with stirring. At a temperature of about 100° C, the mixture became transparent, but became heterogeneous at about 120° C. On further heating, water began to distill off at about 180° C. When the mixture was reacted at 180° to 195° C for 5 hours, it became transparent. When it was further reacted at this temperature for 3 hours, the acid value of the reaction product became zero. As a result of the same analysis as in Example 1, the resulting product was found to be a compound containing mainly an imide ring-containing glycol of the following formula (B):

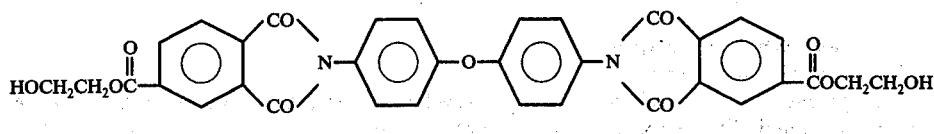

Then, the temperature was increased to more than 200° C, and 46 g of the ethylene glycol was distilled off. The temperature was then reduced to 150° C, and 76.8 g (0.4 mol) of trimellitic anhydride was added (the OH/COOH ratio was 1.75). When the reaction was performed at 180° to 190° C for 1 hour, water distilled off, and a viscous resinous product having an acid value of 108 was obtained. Then, the temperature was reduced to 130° C, and 58.5 g (0.25 mol) of 1,2,3,4-butanetetracarboxylic acid and 39.6 g (0.2 mol) of 4,4'-diaminodiphenylmethane were added. When the reaction was performed at 130° to 150° C for 1 hour, water distilled off, and a reddish-brown transparent resinous material having an acid value of 126 was obtained. Then, the temperature was reduced to 110° C, and 50 g of aqueous ammonia (concentration more than 28%; industrial grade) diluted with 100 g of water was added, and the mixture was stirred for 30 minutes at 100° C. The excess ammonia volatilized and a reddish-brown transparent water-soluble heat-resistant insulating varnish was obtained. The varnish was further diluted with water to adjust the viscosity of the varnish to 16 poises (measured at 30° C using a Brookfield-type viscometer). The non-volatile content of this varnish (after drying for 2 hours at 200° ± 2° C) was 43.6%. The varnish had a pH of 6.7.

EXAMPLE 3

A 1-liter four-necked flask equipped with a Dean-Stark trap, a thermometer, a dropping funnel and a stirrer was charged with 115.2 g (0.6 mol) of trimellitic anhydride, 32.4 g (0.3 mol) of meta-phenylene diamine and 212 g (2.0 mols) of diethylene glycol, and the mixture was heated with stirring. At a temperature of about 100° C, the mixture became transparent, but became heterogeneous at a temperature of about 120° C. On further heating, water began to distill off at about 180° C. When the mixture was reacted at 180° to 195° C for 7 hours, it became transparent. When it was further reacted at this temperature for 3 hours, the acid value of the reaction product became zero. As a result of the same analysis as in Example 1, the resulting product was found to be a compound containing mainly an imide ring-containing glycol of the following formula (C):

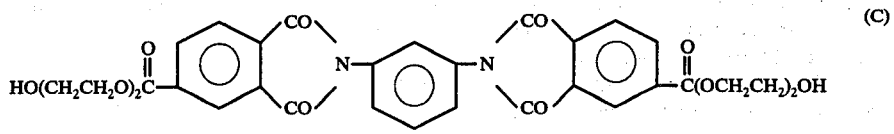

Then, the temperature was increased to 245° C, and 106 g of the diethylene glycol was distilled off. The temperature was then reduced to 150° C, and 76.8 g (0.4 mol) of trimellitic anhydride was added (the OH/-COOH ratio was 1.16). When the mixture was reacted at 180° to 195° C for 0.5 hour, water distilled off, and a viscous resinous product having an acid value of 132 was obtained. Then, the temperature was reduced to 130° C, and 58.5 g (0.25 mol) of 1,2,3,4-butanetetracarboxylic acid and 60.0 g (0.3 mol) of 4,4'-diaminodiphenyl ether were added. When the mixture was reacted at 130° to 150° C for 1 hour, water distilled off, and a reddish-brown transparent resinous product having an acid value of 109 was obtained. Then, the temperature was further reduced to 110° C, and 50 g of aqueous ammonia (concentration more than 28%; industrial grade) diluted with 100 g of water was added. When the mixture was stirred at 100° C for 30 minutes, the excess ammonia volatilized, and a reddish-brown transparent water-soluble heat-resistant insulating varnish was obtained. The varnish was diluted further with water to adjust the viscosity of the varnish (as measured at 30° C using a Brookfield-type viscometer) of 20 poises. The non-volatile content (after drying for 2 hours at 200° ± 2° C) was 44.3%. The varnish had a pH of 6.8.

EXAMPLE 4

A 1-liter four-necked flask equipped with a Dean-Stark trap, a thermometer, a dropping funnel and a stirrer was charged with 76.8 g (0.4 mol) of trimellitic anhydride, 49.6 g (0.2 mol) of 3,3'-diaminodiphenyl sulfone and 300 g (2.0 mols) of triethylene glycol, and the mixture was heated with stirring. At a temperature of about 100° C, it became transparent, but at about 120° C, became heterogeneous. On further heating with stirring, water began to distill off at about 180° C. When the mixture was reacted at 180° to 195° C for 5 hours, it became transparent. When it was reacted further at this temperature for 2 hours, the acid value of the reaction product became zero. As a result of the same analysis as in Example 1, the resulting product was found to be a compound containing mainly an imide ring-containing glycol of the formula (D):

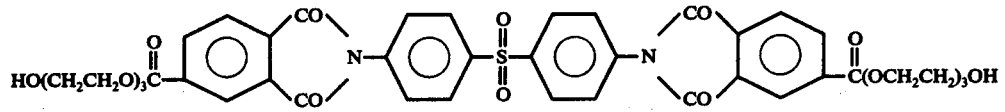

Then, 92 g of the triethylene glycol was distilled off at reduced pressure. The temperature was then reduced to 150° C, and 57.6 g (0.3 mol) of trimellitic anhydride and 83.0 g (0.5 mol) of isophthalic acid were added (the OH/COOH ratio was 1.24). When the mixture was reacted at 180° to 190° C for 2 hours, water distilled off, and a viscous resinous product having an acid value of 116 was obtained. The temperature was then reduced to 130° C, and 108 g (0.5 mol of 1,2,3,4-butanetetracarboxylic monoanhydride and 100 g (0.5 mol) of 4,4'-diaminodiphenyl ether were added. When the mixture was reacted at 130° to 150° C for 1 hour, water distilled off, and a reddish-brown transparent resinous product having an acid value of 80 was obtained. The temperature was then reduced to 110° C, and 40 g of aqueous ammonia (concentration more than 28%; industrial grade) diluted with 100 g of water was added through the dropping funnel. When themixture was stirred at 100° C for 30 minutes, the excess ammonia volatilized, and a reddish-brown transparent water-soluble heat-resistant insulating varnish was obtained. The varnish was further diluted with water to adjust the viscosity of the varnish to 18 poises (as measured at 30° using Brookfield-type viscometer). The non-volatile content of this varnish (after drying for 2 hours at 200° ± 2° C) was 39.8%. The varnish had a pH of 6.9.

EXAMPLE 5

A compound comprising an imide ring-containing glycol of the formula (A) was prepared in the same way as in Example 1 from 76.8 g (0.4 mol) of trimellitic anhydride, 39.6 g (0.2 mol) of 4,4'-diaminodiphenylmethane and 124 g (2.0 mols) of ethylene glycol.

The temperature was then increased to more than 200° C, and 48 g of the ethylene glycol was removed. Then, the temperature was reduced to 150° C, and 38.4 g (0.2 mol) of trimellitic anhydride and 51.6 g (0.2 mol) of 4,4'-dicarboxydiphenyl ether were added (the OH/COOH ratio was 2.02). When the mixture was reacted at 180 to 200° C for 3 hours, water distilled off, and a viscous resinous product having an acid value of 41 was obtained. Then, the temperature was reduced to 100° C, and 59.4 g (0.3 mol) of 1,2,3,4-butanetetracarboxylic dianhydride and 32.4 g (0.3 mol) of para-phenylene diamine were added. When the mixture was reacted at 130° to 150° C for 30 minutes, a reddish-brown transparent resinous product having an acid value of 35 was obtained. Then, 35 g of triethylene glycol was added, and the temperature was reduced to 110° C. Then, 20 g of aqueous ammonia (concentration more than 28%, industrial grade) diluted with 100 g of water was added through the dropping funnel, and the mixture was stirred at 100° C for 10 minutes. The excess ammonia consequently volatilized, and a reddish-brown transparent water-soluble heat-resistant insulating varnish was obtained. The varnish was further diluted with water to adjust the viscosity of the varnish to 21 poises (as measured at 30° C using a Brookfield-type viscometer). The non-volatile content of this varnish (after drying for 2 hours at 200° ± 2° C) was 40.5%. The varnish had a pH of 7.0.

EXAMPLE 6

A mixture of the following products

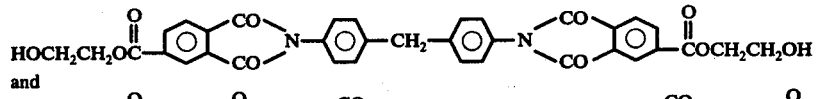

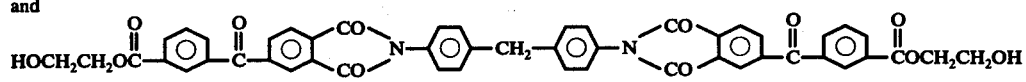

was prepared in the same way as in Example 1 from 76.8 g (0.4 mol) of trimellitic anhydride, 59.2 g (0.2 mol) of 3,4,4'-diphenylketonetricarboxylic anhydride, 59.4 g (0.3 mol) of 4,4'-diaminodiphenylmethane and 186 g (3.0 mols) of ethylene glycol.

Then, the temperature was increased to more than 200° C, and 106 g of the ethylene glycol was removed. Then, the temperature was reduced to 150° C, and 118.4 g (0.4 mol) of 3,4,3'-benzophenonetricarboxylic anhydride was added (the OH/COOH ratio was 1.65). When the mixture was reacted at 180° to 200° C for 1 hour, water distilled off, and a viscous resinous product having an acid value of 102 was obtained. Then, the temperature was reduced to 130° C, and 234 g (1.0 mol) of 1,2,3,4-butanetetracarboxylic acid and 198 g (1.0 mol) of 4,4'-diaminodiphenylmethane were added. When the mixture was reacted at 130 to 150° C for 1 hour, a reddish-brown transparent resinous product having an acid value of 98 was obtained. Then, 150 g of ethylene glycol monobutyl ether was added, and the temperature was reduced to 100° C. Then 70 g of aqueous ammonia (concentration more than 28%, industrial grade) and 50 g of triethanolamine, diluted with 100 g of water, were added through the dropping funnel, and the mixture was stirred for 20 minutes at 100° C to volatilize the excess ammonia. Water was further added to the resulting reddish-brown transparent water-soluble heat-resistant insulating varnish to adjust the viscosity of the varnish to 15 poises (as measured at 30° C using a Brookfield-type viscometer). The non-volatile content of this varnish (after drying for 2 hours at 200° ± 2° C) was 37.8%. The varnish had a pH of 6.8.

EXAMPLE 7

A compound of an imide ring-containing glycol (A) was prepared in the same way as in Example 1 from 76.8 g (0.4 mol) of trimellitic anhydride, 39.6 g (0.2 mol) of 4,4'-diaminodiphenylmethane and 124 g (2.0 mols) of ethylene glycol. Then, the temperature was increased to above 200° C, and 65 g of the ethylene glycol was distilled off. The temperature was then reduced to 150° C, and 76.8 g (0.4 mol) of trimellitic anhydride and 26.1 g (0.1 mol) of tris-(2-hydroxyethyl)-isocyanurate were added (the OH/COOH ratio was 1.50). When the mixture was reacted at 180° to 195° C for 1 hour, water distilled off, and a viscous resinous product having an acid value of 95 was obtained. The temperature was then reduced to 130° C, and 70.2 g (0.3 mol) of 1,2,3,4-butanetetracarboxylic acid and 60.0 g (0.3 mol) of 4,4'-diaminodiphenylether were added. When the mixture was reacted at 130° to 150° C for 2 hours, a reddish-brown transparent resinous product having an acid value of 76 was obtained. Then, 120 g of ethylene glycol was added, and the temperature was reduced to 100° C. Subsequently, 25 g of aqueous ammonia (concentration more than 28%, industrial grade) and 13 g of N-methyldiethanolamine, diluted with 100 g of water, were added through the dropping funnel. When the mixture was stirred at 100° C for 30 minutes, the excess ammonia volatilized and a reddish-brown transparent water-soluble heat-resistant insulating varnish was obtained. The varnish was further diluted with water to adjust the viscosity of the varnish to 25 poises (as measured at 30° C using a Brookfield-type viscometer). The non-volatile content of this varnish (after drying for 2 hours at 200° ± 2° C) was 41.1%. The pH of this varnish was 6.8.

EXAMPLE 8

An imide ring-containing glycol mainly comprising a compound of the following formula (F):

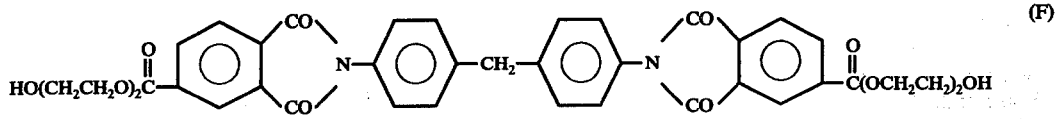

was prepared in the same way as in Example 1 from 115.2 g (0.6 mol) of trimellitic anhydride, 59.4 g (0.3 mol) of 4,4'-diaminodiphenylmethane and 212 g (2.0 mols) of diethylene glycol.

Then, the temperature was increased to 245° C, and 95 g of the diethylene glycol was distilled off. The temperature was then reduced to 150° C, and 76.8 g (0.4 mol) of trimellitic anhydride, 25.4 g (0.1 mol) of bis-(2-hydroxyethyl)terephthalate and 52.2 g (0.2 mol) of tris-(2-hydroxyethyl)isocyanurate were added (the OH/COOH ratio was 2.00). When the mixture was reacted at 180° to 195° C for 1 hour, water distilled off, and a viscous resinous product having an acid value of 77 was obtained. Subsequently, the temperature was reduced to 130° C, and 58.5 g (0.25 mol) of 1,2,3,4-butanetetracarboxylic acid and 49.5 g (0.25 mol) of 4,4'-diaminodiphenylmethane were added. When the mixture was reacted at 130° to 150° C for 1 hour, water distilld of, and a reddish-brown transparent resinous product having an acid value of 74 was obtained. Then, 25 g of triethylene glycol monomethyl ether was added, and the temperature was reduced to 110° C. Then, 40 g of aqueous ammonia (concentration more than 28%, industrial grade) diluted with 100 g of water was added through the dropping funnel. When the mixture was stirred at 100° C for 30 minutes, the excess ammonia volatilized, and a reddish-brown transparent water-soluble heat-resistant insulating varnish was obtained. Water was added to this varnish to adjust the viscosity of the varnish to 23 poises (measured at 30° C using a Brookfield-type viscometer). The non-volatile content of this varnish (after drying for 2 hours at 200° ± 2° C) was 42.0%. The varnish had a pH of 7.0.

EXAMPLE 9

An imide ring-containing glycol (A) was prepared in the same way as in Example 1 from 115.2 g (0.6 mol) of trimellitic anhydride, 59.4 g (0.3 mol) of 4,4'-diaminodiphenylmethane and 186 g (3.0 mols) of ethylene glycol. Then, the temperature was increased to above 200° C, and 117 g of the ethylene glycol was distilled off. The temperature was then reduced to 150° C, and 96 g (0.5 mol) of trimellitic anhydride and 78.3 g (0.3 mol) of tris-(2-hydroxyethyl)isocyanurate were added (the OH/COOH ratio was 1.67). When the mixture was reacted at 180° to 195° C for 1 hour, water distilled off, and a viscous resinous product having an acid value of 98 was obtained. Subsequently, the temperature was reduced to 130° C, and 117 g (0.5 mol) of 1,2,3,4-butanetetracarboxylic acid and 79.2 g (0.4 mol) of 4,4'-diaminodiphenylmethane were added. When the mixture was reacted at 130° to 150° C for 2 hours, water distilled off, and a reddish-brown transparent resinous product having an acid value of 86 was obtained. Then, the temperature was reduced to 110° C, and 50 g of aqueous ammonia (concentration more than 28%, industrial grade) diluted with 100 g of water was added through the dropping funnel. When the mixture was stirred at 100° C for 30 minutes, the excess ammonia volatilized, and a reddish-brown transparent water-soluble heat-resistant insulating varnish was obtained. A solution of 5.0 g of ammonium titanium lactate in water was added, and water was further added to the varnish to adjust the viscosity of the varnish to 18 poises (measured at 30° C using a Brookfield-type viscometer). The non-volatile content of this varnish (after drying for 2 hours at 200° ± 2° C) was 40.5%. The varnish had a pH of 6.9.

EXAMPLE 10

An imide ring-containing glycol (A) was prepared in the same way as in Example 1 from 115.2 g (0.6 mol) of trimellitic anhydride, 59.4 g (0.3 mol) of 4,4'-diaminodiphenylmethane, 37.2 g (0.6 mol) of ethylene glycol and 150 g of N-methyl-2-pyrrolidone. Then, the temperature was increased to 200° C, and 100 g of the N-methyl-2-pyrrolidone was distilled off. The temperature was then reduced to 150° C, and 57.6 g (0.3 mol) of trimellitic anhydride and 15.5 g (0.25 mol) of ethylene glycol were added (the OH/COOH ratio was 1.22). When the mixture was reacted at 180° to 195° C for 1.5 hours, water distilled off, and a viscous resinous product having an acid value of 121 was obtained. Subsequently, the temperature was reduced to 130° C, and 234 g (1.0 mol) of 1,2,3,4-butanetetracarboxylic acid and 198 g (1.0 mol) of 4,4'-diaminodiphenylmethane were added. When the mixture was reacted at 130° to 150° C for 1 hour, water distilled off, and a viscous resinous product having an acid value of 106 was obtained. The temperature was then reduced to 110° C, and 80 g of aqueous ammonia (concentration more than 28%, industrial grade) diluted with 100 g of water was added through the dropping funnel. When the mixture was stirred at 100° C for 30 minutes, the excess ammonia volatilized, and a reddish-brown transparent water-soluble heat-resistant insulating varnish was obtained. Then, the temperature was reduced to 50° C, and a solution of 30 g of ammonium zirconium lactate of the following formula

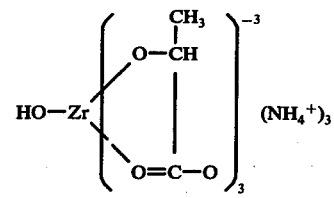

in water was added. Water was further added to this varnish to adjust the viscosity of the varnish to 20 poises (measured at 30° C using a Brookfield-type viscometer). The non-volatile content of this varnish (after drying for 2 hours at 200° ± 2° C) was 38.2%. The varnish had a pH of 6.7.

TEST EXAMPLES

Each of the water-soluble heat-resistant insulating varnishes obtained in Examples 1 to 10 above was coated on a 1.0 mm-thick soft copper wire (corresponding to AWG 18 Copper Wire) using a die at a rate of 6.5 m/min and baked in a vertical-type baking furnace having a length of 3.0 m at a temperature of 400° C. The characteristics of the insulated wires obtained are shown in Table 1.

For comparison, a polyesterimide resin varnish prepared by a customary method from dimethyl terephthalate, ethylene glycol, tris-(2-hydroxyethyl)isocyanurate, trimellitic anhydride and 4,4'-diaminodiphenylmethane as predominant raw materials using a solvent consisting mainly of cresol was coated and baked in the same way as described above, and the characteristics of the resulting wires are also shown in Table 1.

The tests for the characteristics of the insulated wire were conducted in accordance with JCS-333 (1970) (Class H, polyesterimide copper wires).

TABLE 1

| | \multicolumn{11}{c}{Characteristics of Insulated Wires} |
|---|---|---|---|---|---|---|---|---|---|---|---|
| | 1 | 2 | 3 | 4 | 5 | 6 | 7 | 8 | 9 | 10 | Comparison |
| Wire Structure: | | | | | | | | | | | |
| Enameled Wire Diameter (mm) | 1.075 | 1.073 | 1.076 | 1.071 | 1.073 | 1.070 | 1.073 | 1.075 | 1.073 | 1.075 | 1.075 |
| Bare Wire Diameter (mm) | 0.995 | 0.995 | 0.995 | 0.995 | 0.995 | 0.995 | 0.995 | 0.995 | 0.995 | 0.995 | 0.995 |
| Film Thickness (mm) | 0.040 | 0.039 | 0.041 | 0.038 | 0.039 | 0.038 | 0.039 | 0.040 | 0.039 | 0.040 | 0.040 |
| Windability: | | | | | | | | | | | |
| Self-Diameter (normal condition) | Good | Good | Good | Good | Good | Good | Good | Good | Good | Good | Good |
| Self-Diameter (at 20% stretch) | Good | Good | Good | Good | Good | Good | Good | Good | Good | Good | Good |
| After Heating (24 hrs. at 200° C) | 2d, Good | 2d, Good | 1d, Good | 1d, Good | 2d, Good | 2d, Good | 2d, Good | 1d, Good | 1d, Good | 2d, Good | 2d, Good |
| Abrasion Resistance (cycles) (under a load of 700 g) | 87 | 109 | 81 | 76 | 97 | 102 | 70 | 68 | 98 | 79 | 45 |
| Cut-Through Temperature (° C) (2 kg load, 2° C/min) | 448 | 425 | 436 | 410 | 426 | 441 | 428 | 4421 | 436 | 448 | 425 |
| Heat Shock Resistance (200° C × 2 hrs.) | 2d, Good | 1d, Good | 1d, Good | 2d, Good | 1d, Good | 1d, Good | 2d, Good | 2d, Good | 1d, Good | 1d, Good | 2d, Good |
| Dielectric Breakdown (kv) | 13.9 | 15.4 | 14.8 | 15.0 | 13.6 | 14.2 | 15.0 | 14.6 | 15.3 | 15.1 | 13.2 |
| Chemical Resistance (dipped for 24 hrs at room temperature) | | | | | | | | | | | |
| Pencil Hardness (at normal conditions) | 5H | 5H | 5H | 5H | 5H | 5H | 5H | 5H | 5H | 5H | 5H |
| Pencil Hardness (after dipping in 5% NaOH) | 4H | 5H | 5H | 5H | 4H | 5H | 5H | 5H | 5H | 5H | 4H |
| Pencil Hardness (after dipping in $H_2SO_4$ (specific gravity: 1.2)) | 5H | 5H | 5H | 5H | 5H | 5H | 5H | 5H | 5H | 5H | 5H |
| Crazing in Water* | | | | | | | | | | | |

As demonstrated above, baked films obtained from the insulating varnish of this invention have superior crazing characteristics, wear resistance and heat resistance as compared with the conventional solvent-type esterimide resin varnishes in which cresol is a main solvent. Since water is used as a medium in the varnish of this invention, atmospheric pollution as a result of volatilization of the solvent or toxic gases during baking is not caused, and the working environment is extremely safe. In addition, the varnish of this invention scarcely gives off any offensive odor, and there is almost no danger of fire or explosion. Furthermore, the use of water as a medium renders the varnish of this invention far less expensive than the conventional solvent-type esterimide resin varnishes, and the commercial significance of this invention is great.

While the invention has been described in detail and with reference to specific embodiments thereof, it will be apparent to one skilled in the art that various changes and modifications can be made therein without departing from the spirit and scope thereof.

What is claimed is:

1. A water-soluble, heat-resistant, insulating varnish comprising an aqueous solution of a resin containing ester groups and imide groups in the molecule, wherein said aqueous solution of said resin is obtained by adjusting the pH of said insulating varnish to between 5 and 9 by the addition of a volatilizable basic compound, said resin consisting of the reaction product of (A) a carboxyl-containing polyesterimide resin having an acid value of about 30 to 150 obtained by reacting (a) a polyhydric alcohol component comprising at least one organic polyhydric alcohol and further containing about 10 to 60 mol % of an imide ring-containing glycol of the general formula (I):

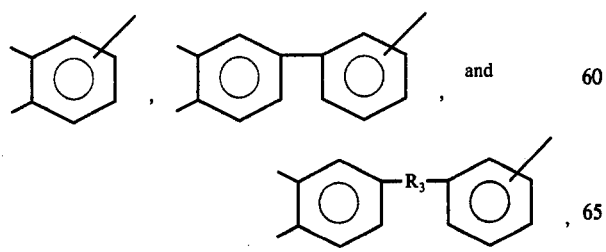

wherein $R_1$ is a trivalent aromatic group selected from the group consisting of

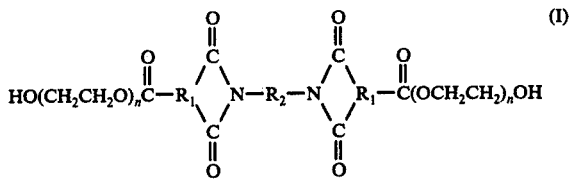

wherein $R_3$ is selected from the group consisting of

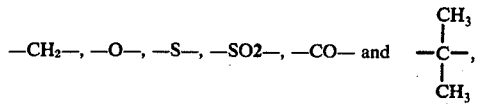

$R_2$ is a divalent organic group, and $n$ is an integer of 1 to 3, with (b) a polycarboxylic acid component comprising at least one trivalent or divalent organic carboxylic acid or the anhydride thereof said divalent organic carboxylic acid or the anhydride thereof represented by the general formula (VI) or (VII), respectively $$HOOC-R_5-COOH \qquad (VI)$$

in which $R_5$ is a divalent organic group selected from the group consisting of $-(CH_2)-n_2$ in which $n_2$ is an integer of 1 to 8,

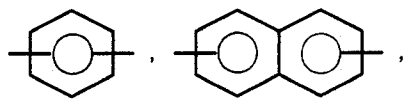

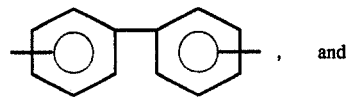

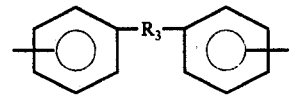

in which $R_3$ is as defined above, about 30 to 100 mol % of which comprises an aromatic tricarboxylic acid or the anhydride thereof represented by the formula (IV) or (V), respectively

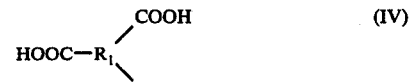

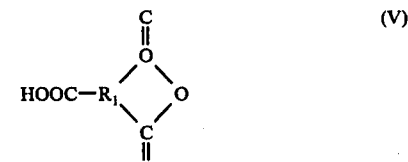

with $R_1$ as defined above so that the equivalent ratio (OH/COOH) between the polyhydric alcohol component and the polycarboxylic acid component is about 1.0 to 2.0 and wherein the amount of the imide ring-containing glycol of the general formula (I) among the total amount of the (A) component is about 20 to 70% by weight;

(B) 1,2,3,4-butanetetracarboxylic acid or an imide-forming derivative thereof capable of forming an imide ring by reaction with an organic diamine; and (C) an organic diamine, wherein the total amount of (B) and (C) is about 20 to 200 parts by weight per 100 parts by weight of said polyesterimide resin (A).

2. The insulating varnish of claim 1, which further includes a water-soluble organic metal compound as a curing agent.

3. The insulating varnish of claim 2, wherein said organic metal compound is titanium ammonium lactate, titanium lactate or zirconium ammonium lactate.

4. The insulating varnish of claim 3, wherein the amount of said organic metal compound is up to about 10 parts by weight per 100 parts by weight of said resin comprising the reaction product of (A), (B) and (C).

5. The insulating varnish of claim 1, wherein said total amount of (B) and (C) is 30 to 150 parts by weight per 100 parts by weight of said polyesterimide resin (A).

6. The insulating varnish of claim 1, wherein the equivalent ratio of said 1,2,3,4-butanetetracarboxylic acid or the imide-forming derivative thereof (B) to said organic diamine (C) is about 0.5 to 2.

7. The insulating varnish of claim 6, wherein said equivalent ratio is 0.8 to 1.3.

8. The insulating varnish of claim 1, wherein said volatilizable basic compound is selected from the group consisting of ammonia, aqueous ammonia, trialkylamines, N-alkyldiethanolamines, N,N-dialkylethanolamines, monoethanolamine, diethanolamine and triethanolamine.

9. The insulating varnish of claim 1, wherein up to about 30% by weight of the water in said aqueous solution is replaced by a water-soluable high-boiling solvent.

10. The water-soluble heat-resistant insulating varnish of claim 1, wherein said imide ring-containing glycol of formula (I) is prepared by reacting about 2 mols of an aromatic tricarboxylic acid anhydride with 1 mol of an organic diamine in a glycol selected from the group consisting of ethylene glycol, diethylene glycol and triethylene glycol.

11. The water-soluble heat-resistant insulating varnish of claim 1, wherein said at least one organic polyhydric alcohol is ethylene glycol, propylene glycol, 1,4-butanediol, 1,5-pentanediol, 1,6-hexanediol, 1,7-heptanediol, 1,8-octanediol, 1,9-nonanediol, 1,10-decanediol, diethylene glycol, dipropylene glycol, triethylene glycol, 4,4'-dihydroxymethyldiphenyl, 4,4'-dihydroxyethyldiphenyl, 4,4'-dihydroxymethyldiphenylmethane, 4,4'-dihydroxyethyldiphenylmethane, 4,4'-dihydroxymethyldiphenyl ether, 4,4'-dihydroxyethyldiphenyl ether, 4,4'-dihydroxymethyldiphenyl sulfide, 4,4'-dihydroxyethyldiphenyl sulfide, 4,4'-dihydroxymethyldiphenyl sulfone, 4,4'-dihydroxyethyldiphenyl sulfone, 4,4'-dihydroxymethyldiphenyl ketone, 4,4'-dihydroxyethyldiphenyl ketone, 4,4'-dihydroxymethyldiphenylpropane, 4,4'-dihydroxyethyldiphenylpropane, bis-(2-hydroxyethyl)-terephthalate, bis-(2-hydroxyethyl)isophthalate, bis-(2-hydroxyethyl)phthalate, glycerol, trimethylol propane, 1,2,6-hexanetriol, 3-methyl-1,3,5-hexanetriol, tris-(2-hydroxyethyl)isocyanurate, pentaerythritol, or mixtures of these organic polyhydric alcohols.

12. The water-soluble heat-resistant insulating varnish of claim 1, wherein said aromatic tricarboxylic acid or the anhydride thereof is trimellitic acid (or the anhydride thereof), hemimellitic acid (or the anhydride thereof), trimesic acid (or the anhydride thereof), 3,4,3' (or 3,4,4')-diphenyltricarboxylic acid (or the anhydride thereof), 3,4,3' (or 3,4,4')-diphenylmethanetricarboxylic acid (or the anhydride thereof), 3,4,3' (or 3,4,4')-diphenylether tricarboxylic acid (or the anhydride thereof), 3,4,3' (or 3,4,4')-diphenylsulfidetricarboxylic acid (or the anhydride thereof), 3,4,3' (or 3,4,4')-diphenylsulfonetricarboxylic acid (or the anhydride thereof), 3,4,3' (or 3,4,4')-diphenylketonetricarboxylic acid (or the anhydride thereof), 3,4,3' (or 3,4,4')-diphenylpropanetricarboxylic acid (or the anhydride thereof), or mixtures thereof.

13. The water-soluble heat resistant varnish of claim 1, wherein said divalent organic carboxylic acid or the anhydride thereof is succinic acid, succinic anhydride, adipic acid, malonic acid, sebacic acid, phthalic acid, phthalic anhydride, isophthalic acid, terephthalic acid, naphthalene dicarboxylic acid having the formula

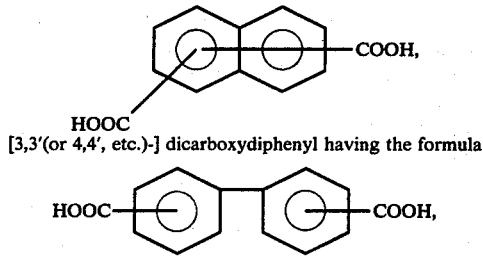

[3,3'(or 4,4', etc.)-] dicarboxydiphenyl having the formula

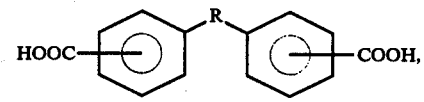

dicarboxydiphenyl methane, dicarboxydiphenyl ether, dicarboxydiphenyl sulfide, dicarboxydiphenyl sulfone, dicarboxydiphenyl ketone, dicarboxydiphenyl propane having the formula

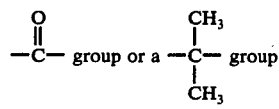

wherein R represents a methylene group, an oxygen atom, a sulfur atom, an -SO$_2$- group, a $$-\overset{O}{\underset{\|}{C}}- \text{ group or a } -\overset{CH_3}{\underset{CH_3}{\overset{|}{\underset{|}{C}}}}- \text{ group}$$

or mixtures thereof.

14. The water-soluble heat-resistant insulating varnish of claim 1, wherein said 1,2,3,4-butanetetracarboxylic acid or the imide-forming derivative thereof is selected from the group consisting of 1,2,3,4-butanetetracarboxylic acid, 1,2,3,4-butanetetracarboxylic monoanhydride, 1,2,3,4-butanetetracarboxylic dianhydride, and dimethyl 1,2,3,4-butanetetracarboxylate.

15. The water-soluble heat-resistant insulating varnish of claim 1, wherein said organic diamine (C) is represented by the formula $$H_2N-R_2-NH_2$$

in which $R_2$ is selected from the group consisting of

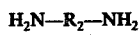

wherein $n_1$ is an integer of 1 to 6,

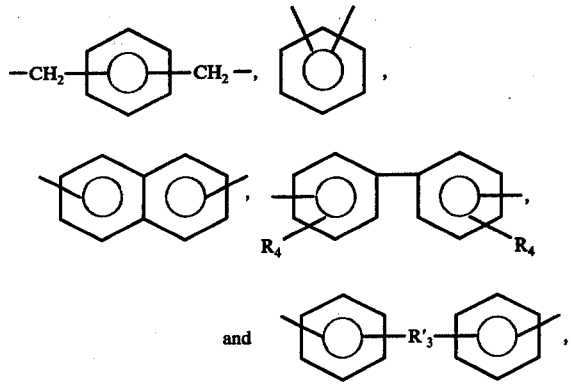

wherein $R'_3$ is selected from the group consisting of
—CH$_2$—, —O—, —S—, —SO$_2$—, —CO—,

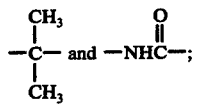

and $R_4$ is selected from the group consisting of a hydrogen atom, an alkoxy group, an alkyl group and a halogen atom.

16. The water-soluble heat-resistant insulating varnish of claim 10, wherein said organic diamine reacted with the said anhydride is represented by the formula $$H_2N-R_2-NH_2$$

in which $R_2$ is selected from the group consisting of

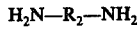

wherein $n_1$ is an integer of 1 to 6,

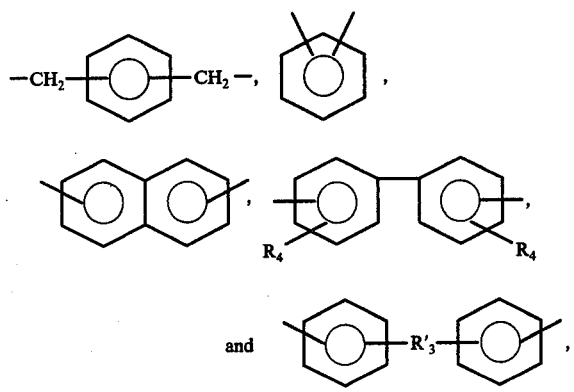

wherein $R'_3$ is selected from the group consisting of
—CH$_2$—, —O—, —S—, —SO$_2$—, —CO—,

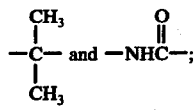

and $R_4$ is selected from the group consisting of a hydrogen atom, an alkoxy group, an alkyl group and a halogen atom.

17. The water-soluble heat-resistant insulating varnish of claim 1, wherein the equivalent ratio (OH/COOH) between the polyhydric alcohol component and the polycarboxylic acid component is 1.15 to 1.95.

18. The water-soluble heat-resistant insulating varnish of claim 1, wherein the acid value of the carboxyl-containing polyesterimide resin is 50 to 120.

19. The water-soluble heat-resistant insulating varnish of claim 1, wherein the reaction product of (A) a carboxyl-containing polyesterimide resin, (b) 1,2,3,4-butanetetracarboxylic acid or an imide-forming derivative thereof and (C) an organic diamine has an acid value in the range of from about 30 to 150.

20. The water-soluble heat-resistant insulating varnish of claim 1, wherein said resin is dissolved with a volatilizable basic compound in an amount of about 0.3 to 3 equivalents based on the residual carboxyl groups in said resin.

21. The water-soluble heat-resistant insulating varnish of claim 1, which has a pH of from 6 to 8.

22. The water-soluble heat-resistant insulating varnish of claim 10, wherein said aromatic tricarboxylic acid anhydride is represented by the general formula (II)

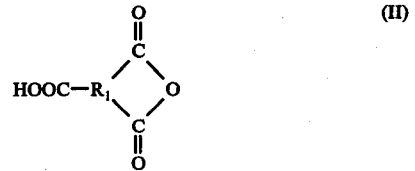

in which $R_1$ is selected from the group consisting of

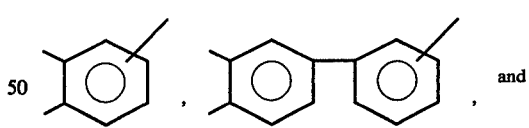

wherein $R_3$ is selected from the group consisting of
—CH$_2$—, —O—, —S—, —SO$_2$—, —CO— and

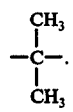

23. The water-soluble heat-resistant insulating varnish of claim 22, wherein said aromatic tricarboxylic acid anhydride is selected from the group consisting of trimellitic anhydride, hemimellitic anhydride, 3,4,3' (or 3,4,4')-diphenyltricarboxylic anhydride, 3,4,3' (or 3,4,4')-diphenylmethanetricarboxylic anhydride, 3,4,3' (or 3,4,4')-diphenylethertricarboxylic anhydride, 3,4,3' (or 3,4,4')-diphenylsulfidetricarboxylic anhydride, 3,4,3' (or 3,4,4')-diphenylsulfonetricarboxylic anhydride, 3,4,3' (or 3,4,4')-diphenylketonetricarboxylic anhydride, 3,4,3' (or 3,4,4')-diphenylpropanetricarboxylic anhydride, and mixtures of these anhydrides.

24. The water-soluble heat-resistant insulating varnish of claim 1, wherein the amount of the imide ring-containing glycol of the general formula (I) among the total amount of the (A) component is 30 to 60% by weight.

25. The water-soluble heat-resistant insulating varnish of claim 4, wherein the amount of said organic metal compound is 0.1 to 5.0 parts by weight per 100 parts by weight of said resin comprising the reaction product of (A), (B) and (C).

* * * * *

UNITED STATES PATENT AND TRADEMARK OFFICE
CERTIFICATE OF CORRECTION

PATENT NO. : 4,101,488
DATED : July 18, 1978
INVENTOR(S) : TAKASHI ISHIZUKA ET AL It is certified that error appears in the above-identified patent and that said Letters Patent are hereby corrected as shown below:

Column 4, line 54, change "bis-(2-hydroxyethyl)iso-phthalate to read --bis-(2-hydroxyethyl)terephthalate--

Signed and Sealed this

Seventh Day of August 1979

[SEAL]

Attest:

Attesting Officer

LUTRELLE F. PARKER
Acting Commissioner of Patents and Trademarks